United States Patent [19]

Wedam

[11] 4,240,013
[45] Dec. 16, 1980

[54] HORIZONTAL DEFLECTION AND POWER SUPPLY CIRCUIT WITH A START-UP ARRANGEMENT

[75] Inventor: Werner F. Wedam, Lawrenceville, N.J.

[73] Assignee: RCA Corporation, New York, N.Y.

[21] Appl. No.: 43,083

[22] Filed: May 29, 1979

[51] Int. Cl.³ .............................................. H01J 29/70
[52] U.S. Cl. .................................... 315/411; 358/190
[58] Field of Search ........................... 315/411; 358/190

[56] References Cited

U.S. PATENT DOCUMENTS

| | | | |
|---|---|---|---|
| 3,936,115 | 2/1976 | Dietz | 315/408 X |
| 3,947,632 | 3/1976 | Giger et al. | 358/190 |
| 4,112,465 | 9/1978 | Willis | 315/411 X |
| 4,127,875 | 11/1978 | Fernsler et al. | 358/190 |

Primary Examiner—Malcolm F. Hubler
Attorney, Agent, or Firm—Eugene M. Whitacre; Paul J. Rasmussen; Joseph J. Laks

[57] ABSTRACT

A horizontal oscillator provides switching signals for use by a trace switch of a horizontal deflection circuit and to drive a push-pull output stage. The push-pull output stage provides an AC supply voltage to the primary of a power transformer. The rectified secondary winding voltage of the transformer provides a B+ supply voltage to the deflection circuit. After the elapse of a start-up interval, energization voltage for the horizontal oscillator is provided by either the power transformer or the deflection circuit. During the start-up interval the push-pull output stage self-oscillates as an astable multivibrator to develop the AC supply voltage within that interval.

10 Claims, 1 Drawing Figure

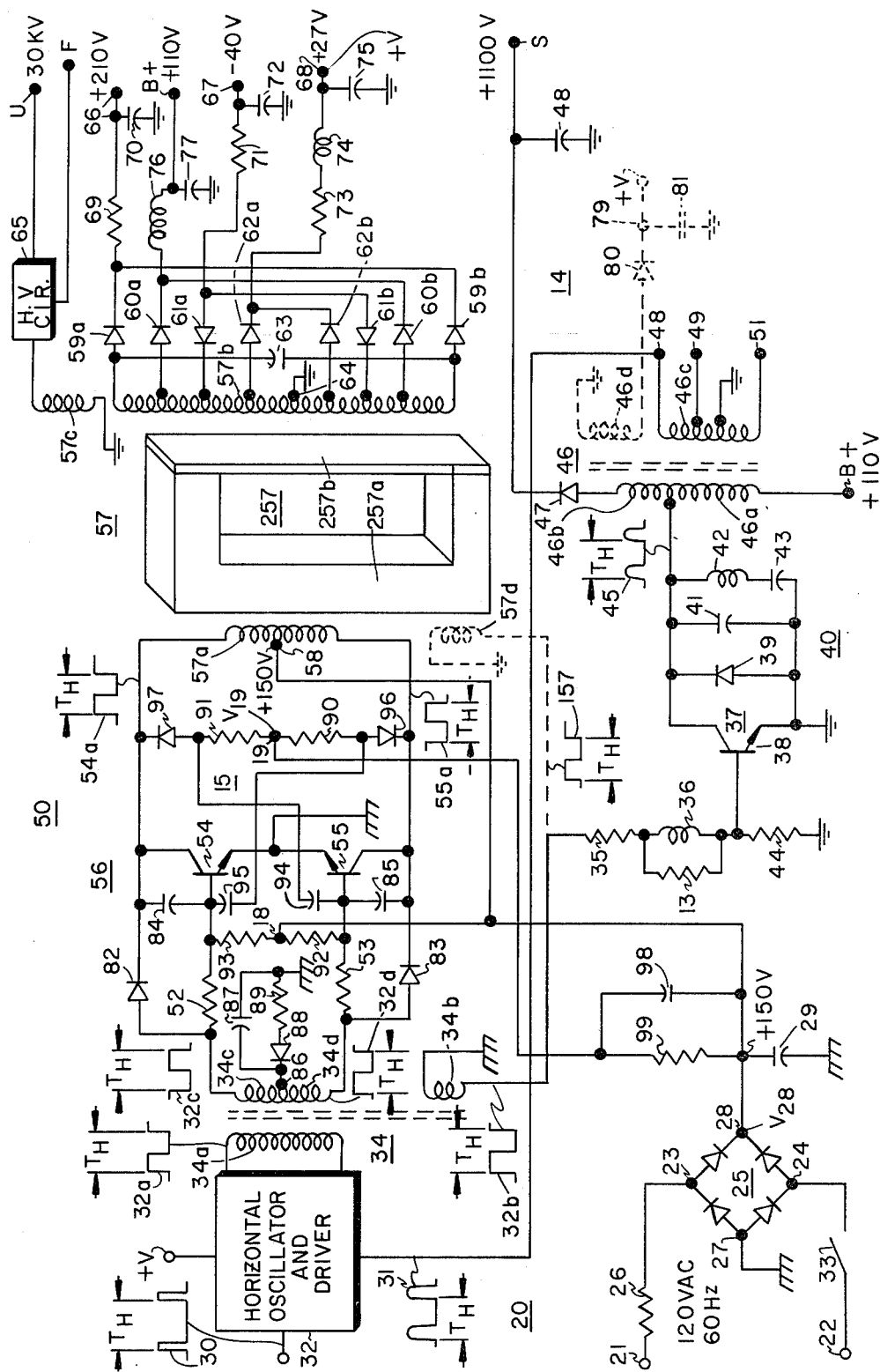

HORIZONTAL DEFLECTION AND POWER SUPPLY CIRCUIT WITH A START-UP ARRANGEMENT

BACKGROUND OF THE INVENTION

This invention relates to deflection and power supply circuits.

The horizontal oscillator of a television receiver provides switching signals to the trace switch of a horizontal deflection circuit for developing scanning current in a horizontal deflection winding. After the elapse of a start-up interval, rectified retrace pulses provide an energizing low B+ voltage to the oscillator. A start-up arrangement must therefore be provided to develop the low B+ voltage when the deflection circuit is inoperative.

A high B+ voltage of +120 volts DC, for example, may be provided by rectifying the secondary winding voltage of a power transformer. When operated at the horizontal deflection rate, the transformer may be of compact design. A power output switching stage provides the exciting voltage to the primary winding of the transformer. The horizontal oscillator provides horizontal rate drive signals which are transformer coupled to the switching elements of the power output stage.

The power supply voltage for the power output switching stage is obtained from rectified AC line mains voltage. The only portion of the described deflection and power supply circuit which is not conductively isolated from a mains supply terminal is the power output switching stage. By designing the power output switching stage to be self-oscillatory during the start-up interval, chassis mains isolation is retained while providing a start-up arrangement which is operative when the horizontal oscillator is not yet energized.

SUMMARY OF THE INVENTION

An oscillator provides alternating current drive voltage to a push-pull power switching circuit of a power supply. The power supply develops a B+ voltage for a deflection circuit. The oscillator energizing voltage, after elapse of a start-up interval, is developed by one of the power supply and deflection circuits. A start-up circuit enables the power switching circuit to self-oscillate to develop a supply or energizing voltage during the start-up interval. When the oscillator is sufficiently energized to begin developing the alternating current drive voltage, the push-pull output stage stops self-oscillating.

BRIEF DESCRIPTION OF THE DRAWING

The FIGURE illustrates a deflection and power supply circuit with a start-up arrangement embodying the invention.

DESCRIPTION OF THE INVENTION

In the FIGURE, 120 volt, 60 Hertz, AC line mains supply voltage developed across terminals 21 and 22 is coupled to input terminals 23 and 24 of a full-wave bridge rectifier 25. A current limiting resistor 26 is coupled between terminals 21 and 23. An on-off switch 33 is coupled between terminals 22 and 24. Output terminal 27 comprises the ground current return terminal that is not isolated from the AC mains supply. Coupled across output terminals 27 and 28 is a filter capacitor 29. Thus, at terminal 28, there is developed a filtered but unregulated DC voltage $V_{28}$ of +150 volts, for example, for use by a deflection and power supply circuit 20.

Horizontal sync signals 30, repeating at a rate of $1/T_H$, where $T_H$ equals the horizontal deflection interval, are obtained from a conventional sync separator of a television receiver, not illustrated. Sync signals 30, and horizontal retrace pulses 31, are coupled to a conventional horizontal oscillator and driver circuit 32 to synchronize the developed horizontal-rate square-wave voltage 32a with the camera information of the composite video signal of the television receiver.

Horizontal-rate square-wave voltage 32a is coupled to a primary winding 34a of a coupling transformer 34. A secondary winding 34b of coupling transformer 34 is coupled through a resistor 35 and an inductor 36 to the base of a horizontal output transistor 38 of a horizontal deflection circuit 40. A resistor 44 is coupled between the base and emitter electrodes of transistor 38. A resistor 13 is coupled across inductor 36 for damping of unwanted oscillations. Horizontal deflection circuit 40 comprises a trace switch 37, a retrace capacitor 41 and a series coupled horizontal deflection winding 42 and trace or "S" shaping capacitor 43. Trace switch 37 comprises horizontal output transistor 38 and a parallel damper diode 39. Horizontal-rate switching signals 32b developed in secondary winding 34b of coupling transformer 34 turn on horizontal output transistor 38 during the horizontal trace interval and turn off the transistor to initiate the horizontal retrace interval.

Horizontal retrace pulses 45, developed at the collector of horizontal output transistor 38, are coupled to the primary winding 46a of a horizontal output or flyback transformer 46. A screen supply voltage of +1100 volts DC, for example, for a screen electrode of a cathode ray tube, not illustrated, is developed at a terminal S that is coupled to a secondary winding 46b of flyback transformer 46 through a rectifier 47. A filter capacitor 48 is coupled to terminal S. A flyback secondary winding 46c provides the retrace pulses 31 at a terminal 48 that are used in the synchronization of horizontal oscillator and driver 32. Other terminals of flyback secondary winding 46c, such as terminals 49 and 51, provide retrace pulses for use by other television receiver circuits, not illustrated, such as horizontal blanking, automatic gain control and convergence circuitry.

A secondary winding 34c and a secondary winding 34d of coupling transformer 34 are coupled through respective resistors 52 and 53 to the bases of respective transistors 54 and 55. Transistors 54 and 55 form a push-pull output switching stage 56 of a power supply circuit 50, with the emitter electrodes of transistors 54 and 55 coupled to the nonisolated ground. A primary winding 57a of a power transformer 57 is coupled across the collector electrodes of transistors 54 and 55. Winding 57a is wound around a leg 257a of a rectangular core 257 of power transformer 57. A center tap terminal 58 of primary winding 57a is coupled to the unregulated +150 volt mains supply.

Horizontal-rate drive signals 32c and 32d, obtained from horizontal oscillator 32 and developed in secondary windings 34c and 34d of coupling transformer 34, alternately switch transistors 54 and 55 into conduction. Horizontal-rate exciting voltages 54a and 55a are alternately coupled to power transformer winding 57a. A horizontal-rate alternating current supply voltage is developed across a secondary winding 57b of power transformer 57, and a horizontal-rate alternating current high voltage is developed across a high voltage winding 57c. Windings 57b and 57c are wound around a leg 257b of core 257.

A diode 82 is coupled between secondary winding 34c of coupling transformer 34 and the collector of transistor 54. A diode 83 is coupled between secondary winding 34d and the collector of transistor 55. Diode 82 and 83 bypass some base current from their respective transistors when the transistors are conducting and prevent the transistors from operating in deep saturation. Capacitors 84 and 85 are coupled across the base and collector electrodes of respective transistors 54 and 55 for the purpose of decreasing the rise time of the horizontal rate exciting voltages 54a and 55a.

Secondary windings 34c and 34d may be wound as a single coil with a center tap terminal 86 coupled to the nonisolated ground through a parallel arrangement of a capacitor 87 and series coupled diode 88 and resistor 89. The voltage developed across capacitor 87 aids in generating relatively sharp reverse base currents in transistors 54 and 55 to appropriately turn off the transistors as required.

A high voltage circuit 65 coupled to high voltage winding 57c develops a +30 kilovolt ultor accelerating voltage at a terminal U and a focus voltage at a terminal F. Secondary winding 57b provides the B+ supply voltage of +110 volts DC for horizontal output stage 40 and also provides auxiliary DC supply voltages for the various television receiver circuits. A direct current B+ supply voltage is developed by full-wave rectifiers 60a and 60b and filtered by an inductor 76 and a capacitor 77. A +210 volt DC auxiliary supply at a terminal 66 is developed by full-wave rectifiers 59a and 59b, and filtered by a capacitor 70. A current limiting resistor 69 is coupled to terminal 66. A −40 volt DC auxiliary supply is developed at a terminal 67 by full-wave rectifiers 61a and 61b, and filtered by a capacitor 72. A current limiting resistor 71 is coupled to terminal 67. A +27 volt DC auxiliary supply is developed at a terminal 68 by full-wave rectifiers 62a and 62b and filtered by an inductor 74 and a capacitor 75. A current limiting resistor 73 is coupled to the cathodes of rectifiers 62a and 62b. The ground current return terminal for all the supply voltages developed by power transformer secondary winding 57b and high voltage winding 57c is conductively isolated from the AC line mains supply voltage. A tap terminal 64 of secondary winding 57b is coupled to the isolated ground current return.

To regulate all the television receiver DC supply voltages, other than the nonisolated +150 volt mains supply, power transformer 57 may be constructed as a ferroresonant transformer with the cross-sectional area of leg 257b reduced. Secondary winding 57b is resonated by an appropriately valued capacitor 63, or by resonating high voltage winding 57c with a discrete capacitor, not illustrated, or by the distributed capacitance of the high voltage winding for magnetically saturating core leg 257b each half-cycle of resonant oscillation. The construction, design and operation of ferroresonant transformer 57 may be similar to that described in copending U.S. patent application, Ser. No. 7,815 filed Jan. 30, 1979, by Frank Starr Wendt, entitled "High Frequency Ferroresonant Power Supply for a Deflection and High Voltage Circuit", said application hereby incorporated by reference.

A direct current +V voltage is coupled to horizontal oscillator 32 and energizes the oscillator into providing horizontal-rate square-wave voltage 32a for driving power supply circuit 50 and horizontal output stage 40.

The +V energizing supply is developed at terminal 68 and comprises the +27 volt auxiliary supply voltage obtained from power transformer secondary winding 57b.

Alternatively, the +V energizing voltage may be developed by flyback transformer circuitry, illustrated in dashed lines in the FIGURE. The voltage developed across a flyback transformer winding 46d is rectified by a diode 80 and filtered by a capacitor 81 to develop the +V energizing voltage at a terminal 79.

The drive signal for horizontal output transistor 38 may be developed across a secondary winding 57d of power transformer 57. The drive signal, illustrated in the FIGURE as a dashed waveform 157, is coupled to the base of transistor 38 through resistor 35 and inductor 36. Winding 57d is wound around the unsaturated leg 257a of the core 257.

Alternatively, the +V energizing voltage may be obtained at terminal 68 from the power transformer secondary winding 57b, and the horizontal output drive signals may be obtained from the secondary winding 57d.

With horizontal deflection and power supply circuit 20 as described, most of the television receiver circuits, including horizontal oscillator and driver 32, are conductively isolated from the mains supply. Only output switch stage 56 of power supply circuit 50 is not isolated because the unregulated +150 volt mains supply is coupled to primary winding 57a of power transformer 57.

Upon initial energization of horizontal deflection and power supply circuit 20, upon closure of on-off switch 33, none of the supply voltages, including the +V energizing voltage for horizontal oscillator 32, has yet been developed. Horizontal oscillator 32 is inoperative and no switching signals are coupled to the base of horizontal output transistor 38 either from coupling transformer secondary winding 34b or from power transformer secondary winding 57d.

To provide for start-up of horizontal deflection and power supply circuit 20 during an initial interval after closure of on-off switch 33, push-pull output switching stage 56 is made self-oscillatory. Then, after elapse of the initial start-up interval, when a sufficient +V energization voltage has been developed to permit sustained oscillation of horizontal oscillator and driver 32, push-pull output switching stage 56 ceases to self-oscillate but is switched by drive signals 32c and 32d.

A start-up arrangement comprising resistors 90 and 91, capacitors 94 and 95, and diodes 96 and 97 are coupled with transistors 54 and 55 in a manner forming an astable multivibrator 15, with an oscillating frequency near the horizontal deflection frequency of $1/T_H$. Resistor 90 is coupled to the base of transistor 54 through capacitor 95, and resistor 91 is coupled to the base of transistor 55 through capacitor 94. Diode 96 is coupled between the collector of transistor 55 and capacitor 95, and diode 97 is coupled between the collector of transistor 54 and capacitor 94. Resistors 92 and 93 are series coupled between the bases of transistors 54 and 55, with the junction terminal 18 of the resistors coupled to bridge rectifier output terminal 28.

Upon initial closure of on-off switch 33, the voltage at terminal 28, across filter capacitor 29, begins to increase. This start-up voltage is coupled through a capacitor 98 to the junction terminal 19 of astable multivibrator resistors 90 and 91 and develops a voltage $V_{19}$ at this terminal. Assume, for example, that transistor 54 is the first transistor to conduct. Voltage $V_{28}$ is coupled to the base of transistor 54 through resistor 93, turning on transistor 54. With transistor 54 conducting, load current flows through the upper winding portion of power transformer primary winding 57a and through resistor 91 and diode 97 from voltage $V_{19}$. At the same time, the resulting negative slope of voltage 54a is coupled through capacitor 94 to the base of transistor 55, turning off this transistor. Capacitor 95 is being charged by current from $V_{19}$ through resistor 90 and capacitor 94 is being discharged by current from $V_{28}$ through resistor 92. When capacitor 94 is discharged such that the voltage on the base of transistor 55 becomes positive, transistor 55 is turned on. The resulting negative-going slope caused by the load current flowing through the lower winding portion of the power transformer primary winding and through resistor 90 and diode 96 is coupled to the base of transistor 54 through the fully charged capacitor 95. Now capacitor 94 is being charged by current from $V_{19}$ through resistor 91, and capacitor 95 is being discharged slowly by current from $V_{28}$ through resistor 93. When capacitor 95 is discharged such that the base of transistor 54 becomes positive, transistor 54 is turned on, thus starting the next cycle of multivibrator oscillation. Supply voltages begin to develop at the supply terminals coupled to the power transformer 57 secondary and high voltage windings.

Astable multivibrator 15 continues to self-oscillate until the voltage $V_{19}$ has decreases enough to be unable to provide enough base current to transistors 54 and 55 to sustain oscillation. Voltage $V_{19}$ decreases due to the charging of capacitor 98. The time constant associated with capacitor 98 is selected such that the $+V$ voltage developed at terminal 68, for example, will have increased sufficiently to energize horizontal oscillator and driver 32 to produce drive signals 32a before multivibrator oscillations cease. Once drive signals 32a are developed, they cancel the effects of the self-oscillating circuitry, and during normal operation this circuitry is isolated from the normal circuitry by diodes 96 and 97. A relatively large valued resistor 99 is coupled across capacitor 98. When on-off switch 33 is open-circuited, capacitor 998. When on-off switch 33 is open-circulated, capacitor 98 discharges through resistor 99 and enables restart of multivibrator 15 upon reclosure of switch 33.

Operation of the start-up arrangement is similar to the aforedescribed when the $+V$ energizing voltage is obtained from rectified flyback pulses. Multivibrator 15, however, may be required to self-oscillate for a greater period during start-up because the B+ supply voltage must first increase sufficiently to enable horizontal output stage 40 to begin operation.

With horizontal deflection and power supply circuit 20 as described, circuit start-up is provided relatively inexpensively while still maintaining a high degree of AC line mains voltage isolation.

What is claimed is:

1. A deflection and power supply circuit with a start-up arrangement, comprising:
   an oscillator for providing an alternating current drive voltage;
   a power supply including output switching means coupled to said oscillator and responsive to said alternating current drive voltage for developing a supply voltage for a deflection circuit;
   an energization voltage developed from one of said power supply and said deflection circuit and coupled to said oscillator for energizing said oscillator into oscillation, said energizing voltage being developed after the elapse of a start-up interval; and
   means for enabling said output switching means to self-oscillate during said start-up interval and to cease self-oscillating when said oscillator develops said alternating current drive voltage.

2. A circuit according to claim 1 wherein said oscillator provides switching signals to a trace switch of said deflection circuit.

3. A circuit according to claim 2 wherein said energization voltage is developed by rectification of the voltage produced across a winding of a flyback transformer of said deflection circuit.

4. A circuit according to claims 1 or 2 wherein said power supply includes a power transformer coupled to said output switching means, said supply voltage being developed across a secondary winding of said power transformer.

5. A circuit according to claim 4 wherein said energization voltage is developed from a secondary winding of said power transformer.

6. A circuit according to claim 4 wherein said power transformer comprises a ferroresonant transformer for regulating said supply voltage.

7. A circuit according to claim 5 including high voltage means coupled to a high voltage winding of said ferroresonant transformer for developing an ultor voltage.

8. A circuit according to claims 1 or 2 wherein said means for enabling forms an astable multivibrator with said output switching means.

9. A circuit according to claim 8 wherein said output switching means comprises two transistors arranged as a push-pull stage.

10. A circuit according to claim 1 wherein said output switching means comprises a power amplifier responsive to said alternating current drive voltage for developing an amplified alternating current voltage at an output of said power amplifier and wherein said power supply includes a power transformer coupled to the power amplifier output and rectifier means coupled to said power transformer for developing said supply voltage, said power amplifier self-oscillating during the start-up interval when said alternating current drive voltage is absent and being driven by said alternating current drive voltage during the steady-state interval to provide said supply voltage during both intervals.

* * * * *